United States Patent
Yamamoto et al.

(10) Patent No.: US 8,827,492 B2
(45) Date of Patent: Sep. 9, 2014

(54) BACK LIGHT UNIT AND DISPLAY APPARATUS USING THE SAME

(75) Inventors: Shoji Yamamoto, Fujisawa (JP); Satoshi Ouchi, Kamakura (JP); Mayumi Nagayoshi, Chofu (JP); Hajime Inoue, Obihiro (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 201 days.

(21) Appl. No.: 13/298,322

(22) Filed: Nov. 17, 2011

(65) Prior Publication Data

US 2012/0147277 A1   Jun. 14, 2012

(30) Foreign Application Priority Data

Dec. 13, 2010  (JP) ................................. 2010-276529
Jan. 14, 2011  (JP) ................................. 2011-005400

(51) Int. Cl.
*H04N 3/14*     (2006.01)
*G09F 13/18*    (2006.01)

(52) U.S. Cl.
CPC ............. *G02B 6/0021* (2013.01); *Y10S 362/80* (2013.01)
USPC .................. 362/249.02; 362/311.02; 362/241; 362/97.3; 362/296.02; 362/296.04; 362/800; 362/245; 362/310

(58) Field of Classification Search
CPC .................................................. G02B 6/0021
USPC ......... 362/249.02, 311.02, 241, 97.3, 296.02, 362/296.04, 800, 245, 310; 257/98, 100
See application file for complete search history.

(56) References Cited

U.S. PATENT DOCUMENTS

| | | |
|---|---|---|
| 6,345,899 B1 | 2/2002 | Ohkawa et al. |
| 2005/0002194 A1 | 1/2005 | Kikuchi et al. |
| 2005/0122707 A1 | 6/2005 | Kim |
| 2007/0121340 A1 | 5/2007 | Hoshi |
| 2008/0175022 A1 | 7/2008 | Sugiura et al. |
| 2009/0003002 A1 | 1/2009 | Sato |
| 2009/0129058 A1 | 5/2009 | Tokita et al. |
| 2010/0265694 A1 | 10/2010 | Kim et al. |

FOREIGN PATENT DOCUMENTS

| | | |
|---|---|---|
| CN | 1542989 | 11/2004 |
| JP | 2006-236701 | 9/2006 |
| JP | 2006-286217 | 10/2006 |

(Continued)

OTHER PUBLICATIONS

Office Action in corresponding Japanese Application No. 2011-005400, dated Apr. 8, 2014.

(Continued)

*Primary Examiner* — Elmito Breval

(74) *Attorney, Agent, or Firm* — Antonelli, Terry, Stout & Kraus, LLP.

(57) ABSTRACT

To provide a back light unit that reduces an uneven brightness and has a spatially uniform brightness distribution. According to an aspect of the present invention, the back light unit comprises an LED and a light guide plate for guiding light from the LED to a liquid crystal panel side, wherein a recess is provided on the back surface side of the light guide plate, wherein a plurality of LEDs are housed in the recess, and wherein a light amount limiting member is provided at a position facing the recess on s light exit surface side of the light guide plate. The light amount limiting member is configured, for example, by applying an ink with a predetermined optical property to a transparent sheet.

15 Claims, 14 Drawing Sheets

(56) References Cited

FOREIGN PATENT DOCUMENTS

| | | |
|---|---|---|
| JP | 2007-180021 | 7/2007 |
| JP | 2008-59786 | 3/2008 |
| JP | 2008-177106 | 7/2008 |
| JP | 2009-289701 | 12/2009 |
| JP | 2010-27229 | 2/2010 |

OTHER PUBLICATIONS

Office Action in corresponding Taiwan Application No. 101142546, dated Apr. 23, 2014.

BACK LIGHT UNIT AND DISPLAY APPARATUS USING THE SAME

INCORPORATION BY REFERENCE

The present application claims priority from Japanese applications JP2010-276529 filed on Dec. 13, 2010 and JP2011-005400 filed on Jan. 14, 2011, the content of which is hereby incorporated by reference into this application.

BACKGROUND OF THE INVENTION

The present invention relates to back light units using a light emitting diode (LED) as a light source, for example, and relates to video display devices using the same.

In response to a request for power-saving in recent years, there is a need for a reduction in power consumption also in the back light unit used in a liquid crystal display device. For this reason, as the light source of the back light unit, in place of a fluorescent tube, such as a conventional CCFL, a light emitting diode (LED) with a high luminous efficiency and a high responsiveness (i.e., the LED with which the area control to locally or partially control the light intensity of the back light is easy) is beginning to be used.

The types of the back light unit using an LED as the light source mainly include a direct type and an edge light type (also referred to as a side light type). The edge light type is advantageous in achieving a reduction in thickness (reduction in depth dimension) of a video display device because it has a configuration, wherein a point-like light, such as an LED, is converted into a planar light by means of a tabular light guide plate comprising a transparent resin and emitted to a liquid crystal panel.

As the prior art for the back light device using such a light guide plate, the one described in JP-A-2006-236701 is known, for example. JP-A-2006-236701 discloses a back light device wherein a plurality of recesses are vertically provided in the bottom surface of a light guide plate, with the horizontal direction taken as the longitudinal direction, wherein a plurality of side emission type LEDs are housed in each recess, and wherein the light from the LED is reflected inside the light guide plate and emitted to a liquid crystal panel side.

SUMMARY OF THE INVENTION

While in JP-A-2006-236701, a side emission type (side view type) LED is used as the LED, also in the side view type LED there is a light heading directly upward of the LED, i.e., a light heading toward a liquid crystal panel side in a direction perpendicular to an optical axis direction of the side view type LED. For example, there is a light transmitting through the package of the LED, a light reflected by the inner-wall surface of a recess or by a reflection sheet arranged on the back surface side of a light guide plate, or the like. Such a light produces a point-like light spot or a bright line at a place in the light exit surface of the light guide plate corresponding to an arrangement position of the LED or to a formation position of a recess when the light guide plate is seen from the liquid crystal panel side (from the video observing side). Such a spot or a bright line is viewed as an uneven brightness. JP-A-2006-236701 does not consider this aspect.

The present invention has been made in view of the above circumstances and provides techniques capable of obtaining a uniform brightness distribution by reducing the uneven brightness.

The present invention is characterized by the configurations as set forth in the claims. More specifically, according to an aspect of the present invention, a back light unit comprises: a light source; and a light guide plate for guiding a light from the light source to a liquid crystal panel side, wherein a recess for housing the light source is provided on a back surface side of the light guide plate, and wherein a light amount adjustment member is provided at a position corresponding to the light source or to the recess when seen from a display screen side of the liquid crystal panel.

The light amount adjustment member is configured, for example, by applying an ink having predetermined optical properties to a transparent sheet. The transparent sheet to which this ink is applied is stuck to a light exit surface of the light guide plate.

According to the present invention, an uneven brightness can be reduced and a uniform brightness distribution can be obtained.

The other objects, features and advantages of the invention will become apparent from the following description of the embodiments of the invention taken in conjunction with the accompanying drawings.

DETAILED DESCRIPTION OF THE EMBODIMENTS

Figure 1:
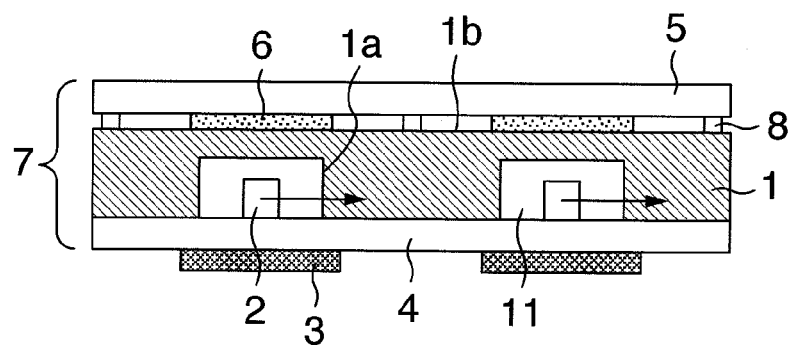
FIG. 1 is a view showing a configuration of a back light unit according to a first example of the present invention.

Hereinafter, embodiments of the present invention will be described with reference to the accompanying drawings. Among the constituent elements to appear herein, the one having the same function is given the same reference numeral, and the repeated explanation thereof is omitted.

Example 1

FIG. 1 shows a configuration of a back light unit according to a first example of the present invention. A back light unit 7 comprises a tabular light guide plate 1, LED 2 as the light source, an LED substrate 3, a reflection sheet 4, an optical sheet 5, a light amount adjustment member 6, and an optical sheet support 8. The elements constituting the back light unit 7 are housed and fixed in a non-illustrated box-shaped metallic chassis, for example. The light of the back light unit 7 is emitted upward of the plane of the figure, and irradiates a non-illustrated liquid crystal panel arranged above the back light unit 7. Here, a surface facing the liquid crystal panel side of the light guide plate 1 is referred to as a light exit surface 1b, and a surface on the opposite side thereof (surface in which the LED substrate 3 is provided) is referred to as a back surface.

In the back surface of the light guide plate 1, a recess 11 (hereinafter, this recess may be referred to as a "groove") for housing LED 2 is provided, wherein a surface of the groove 11, the surface facing the light exit surface of LED 2, is a light incident surface 1a. The groove 11 is formed extending in the horizontal direction (the lateral direction, i.e., the depth direction of the plane of the figure, in FIG. 1) of the liquid crystal panel, for example. The groove 11 may have a continuous shape extending in the horizontal direction of the liquid crystal panel, or may be a plurality of holes arranged in multiple rows along the horizontal direction of the liquid crystal panel. A continuous groove extending in the horizontal direction of the liquid crystal panel may be separated by a plurality of ribs or the like. Here, for LED 2, assume that a side view type (side surface luminous type) LED that emits a white light in a direction parallel to an electrode surface is used and that the LED emits light in an arrow direction, in this example. The light emitted from LED 2 enters the light guide plate 1 from the light incident surface 1a, and travels inside the light guide plate 1 while being reflected, refracted, or diffused by each surface of the light guide 1, and is output from the light exit surface 1b of the light guide plate 1. The light output from the light exit surface 1b is emitted to the liquid crystal panel side via the optical sheet 5 comprising a diffuser, a prism sheet, and a brightness improvement sheet, for example.

For example, a staggered exit-surface optical pattern for spatially uniformizing the outgoing light is formed on the light exit surface 1b. This exit-surface optical pattern may be of fine irregularities, for example, or may be of a dot pattern print using a white ink or the like. The above-described fine irregularities may be processed and formed by a laser or may be formed by molding.

Figure 2:
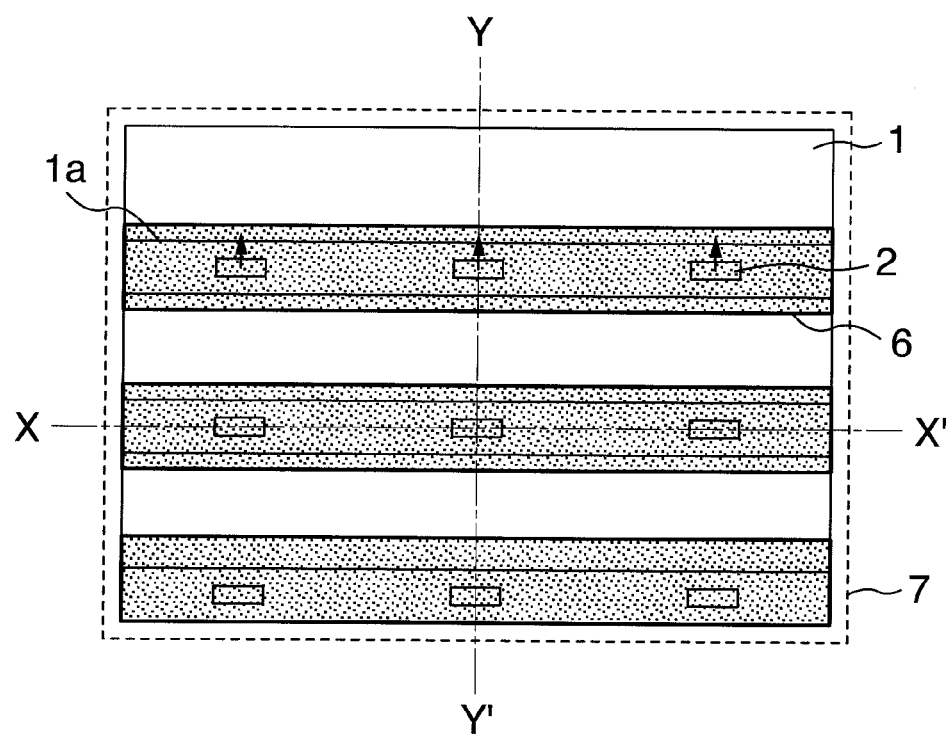
FIG. 2 is a view of a light amount adjustment member 6 according to the first example when seen from a light exit surface side of a light guide plate 1.

If among a plurality of LEDs 2 mounted on the LED substrate 3, one to three LEDs are treated as one control unit, and for the each control unit, the light intensity is controlled in response to the brightness of a video, then the so-called "area control" can be performed, wherein the intensity of light of a backlight is partially controlled. If for example, 15 LEDs are mounted on one LED substrate 3 and three LEDs are treated as one control unit, then in the arrangement of LEDs as shown in FIG. 2, the light guide plate 1 can be divided into five areas for the area control. For example, when the brightness of a video corresponding to a certain area is dark, the light intensity of LED 2 corresponding to this area is reduced, and on the contrary, when it is bright, the light intensity of LED 2 corresponding to this area is increased. Furthermore, if a plurality of sets of the light guide plate 1 with such a configuration and the LED substrate 3 are two-dimensionally arranged, the brightness of more areas can be controlled. If four light guide plates 1 with the above-described example configuration are two-dimensionally arranged, the area control can be performed in a total of 20 areas.

The reflection sheet 4 is arranged on the back surface side opposite to the light exit surface 1b, and has a function to reflect the light, which attempts to transmit through the back surface of the light guide plate 1 and travel to the outside of the light guide plate 1, and return the same into the light guide plate 1. LED 2 mounted on the LED substrate 3 is housed and arranged in the groove 11 of the light guide plate 1 through a hole on the reflection sheet 4. The LED substrate 3 has a rectangular shape extending in the horizontal direction of the liquid crystal panel, for example, wherein a plurality of LEDs 2 are arranged along the longitudinal direction of the LED substrate 3. Accordingly, a plurality of LEDs 2, for example, as shown in FIG. 2, will be arranged inside the groove 11 and along the longitudinal direction thereof. Then, the LED substrate 3 is attached to the back surface of the light guide plate 1 via the reflection sheet 4 so that the reflection sheet 4 is sandwiched by the LED substrate 3 and the light guide plate 1. The hole of the reflection sheet 4 may be large than the size of the LED. The optical sheet support 8 may be configured by setting a pin on the light exit surface 1b of the light guide plate 1, or at the edges of the light guide plate 1, four corners may be fixed. This pin may comprise a white resin, for example, and be inserted into a chassis through the light guide plate 1 and reflection sheet 4 or through the light guide plate 1, reflection sheet 4, and LED substrate 3 so as to fit in the chassis.

This example is characterized in that the light volume adjustment member 6 is provided at a position in the light exit surface 1b of the light guide plate 1, the position facing the recess 11 (provided directly above LED 2). Hereinafter, the function and configuration of the light volume adjustment member 6 will be described. Such a light amount adjustment member has a function to adjust or limit the amount of light heading directly upward of LED 2 and exiting the light exit surface 1b of the light guide plate 1.

First, the function of the light amount adjustment member 6 is described. FIG. 2 is a view of the light amount adjustment member 6 when seen from the light exit surface 1b side of the light guide plate 1. The light exits LED 2 in the direction from Y' to Y. The light incident upon the light guide plate 1 exits from the plane of the figure toward the viewer in the direction perpendicular to the plane of the figure.

The light amount adjustment member 6 is formed extending in the horizontal direction (the lateral direction of the plane of the figure) of the liquid crystal panel so as to correspond to the groove 11 as illustrated in FIG. 1, and is arranged in one row in the horizontal direction of the liquid crystal panel above the light guide plate 1 so as to cover the portion directly above LED 2.

Figure 3:
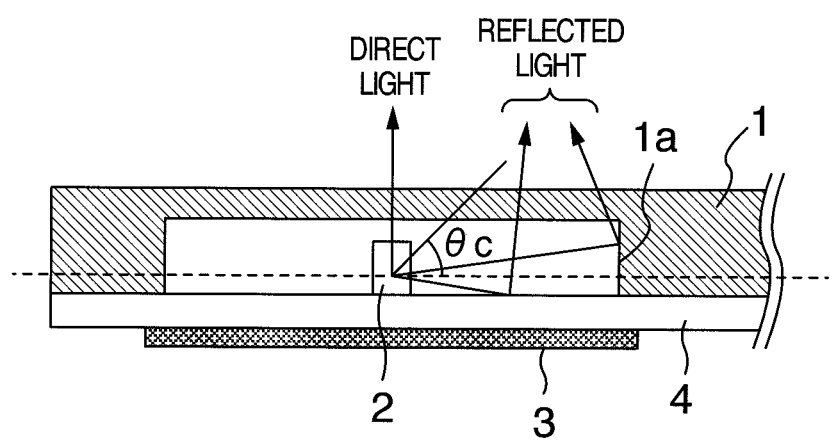
FIG. 3 is a view showing outgoing light from LED 2.

FIG. 3 shows how the light exits LED 2 when the light amount adjustment member 6 is not provided. As shown in FIG. 3, the light that exits LED 2 is incident upon the incident surface 1a of the light guide plate 1, and travels while being reflected or diffused and reflected inside the light guide plate 1, and exits the light exit surface 1b of the light guide plate 1. However, if the angle of emergence of the light that exits LED 2 is equal to or greater than a critical angle 8c, this light is not incident into the light guide plate 1, but is output directly upward of LED 2 (direct light). Even if it is less than critical angle θc, the light that is reflected by the inner wall surface of the recess 11 of the light guide plate 1 and exits, or the light whose angle of emergence exceeds the critical angle θc by being reflected by the reflection sheet 4 will head directly upward of LED 2 (reflected light).

LED 2 is usually packaged, and not all the light heading directly upward from the luminous section of LED 2 are reflected inside the package but a part thereof transmits through the package and is output directly upward. The direct light and the reflected light including the light transmitting through this package increase the brightness directly above LED 2. This is viewed as a bright line or a light spot (bright point) as the entire screen and results in an uneven brightness, which causes image degradation. Here, directly above LED 2 refers to the light exit side of the back light unit in the direction perpendicular to the electrode surface of LED 2.

Realizing a uniform brightness distribution in the surface by adjusting or limiting the amount of the direct light and reflected light, which are the causes of this image degradation, heading directly upward of LED 2 is the function of the light amount adjustment member 6.

Figure 4:
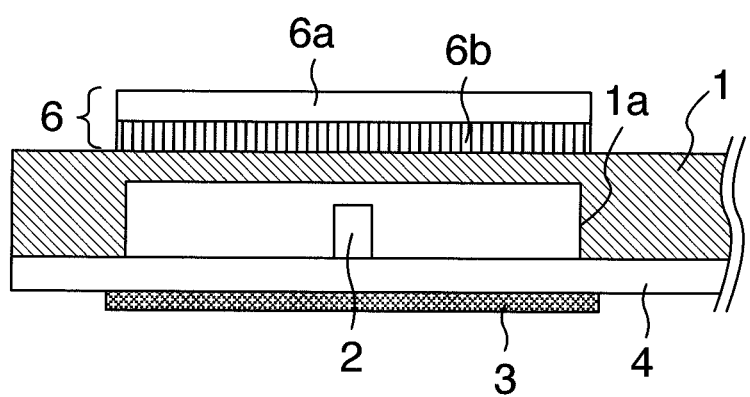
FIG. 4 is a view showing a configuration example of the light amount adjustment member 6 according to the first example.

Next, a configuration example of the light amount adjustment member in Example 1 is described with reference to FIG. 4. As shown in FIG. 4, the light amount adjustment member 6 is provided at a position in the light exit surface 1b of the light guide plate 1 corresponding to the recess 11, and comprises the ink 6b and the transparent sheet 6a. Such a light amount adjustment member 6 is configured by applying the ink 6b onto the transparent sheet 6a. The light amount adjustment member 6 is attached onto the light exit surface 1b of the light guide plate 1 so that the ink 6b is positioned at a place corresponding to the portion directly above each LED 2. The ink 6b functions as a light exit amount reduction part that reduces the amount of the light traveling directly upward of LED 2, transmitting through the light guide plate 1, and exiting the light exit surface 1. Here, the ink 6b is arranged on the light source side so that the thickness of the transparent film 6a does not affect the light volume adjustment of LED 2. However, the transparent film 6a may be attached so as to position on the LED 2 side.

The transparent sheet 6a may comprise a material, such as PET (poly ethylene terephthalate), polycarbonate, or PMMA (poly methyl methacrylate). While the transparent sheet 6a may be a transparent film, the transparent film with a higher transmissivity is more preferable. This is because less amount of light is output into between LEDs 2 than the amount of light output directly above LED 2 and if a film with a low transmissivity is used, it serves as a dark part, which is viewed as an uneven brightness. Moreover, taking into consideration the use of the transparent sheet 6a under high temperature and high humidity conditions or taking into consideration the assembly process in mass production, the transparent sheet 6a preferably comprises a material having less expansion/contraction under external environment (temperature, humidity) and having a high rigidity. The transparent sheet 6 may comprise a transparent film, for example.

Any method capable of applying the ink 6b to the transparent film 6a can be used. For example, screen printing, pad printing, or the like can be used. The transmissivity of the ink 6b can be also controlled by the thickness of the ink or the quality of the material of the ink. With regard to the ink thickness, the thickness is increased if the transmissivity is desired to be reduced, while if the transmissivity is desired to be increased, the thickness is reduced. For the quality of the material of the ink, a material with a low light-absorption and a high reflectivity is preferable. This is because the light that does not transmit through the ink 6b is reflected by the ink 6b and a part of the reflected light returns to the inside of the light guide plate and the light that exits LED 2 can be efficiently utilized.

Figure 5:
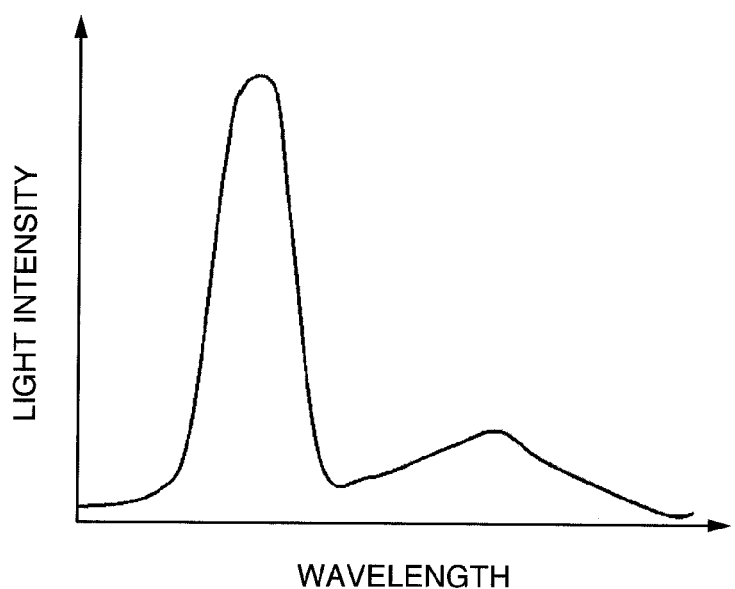
FIG. 5 is a graph showing an example of the spectrum of LED 2.
Figure 6:
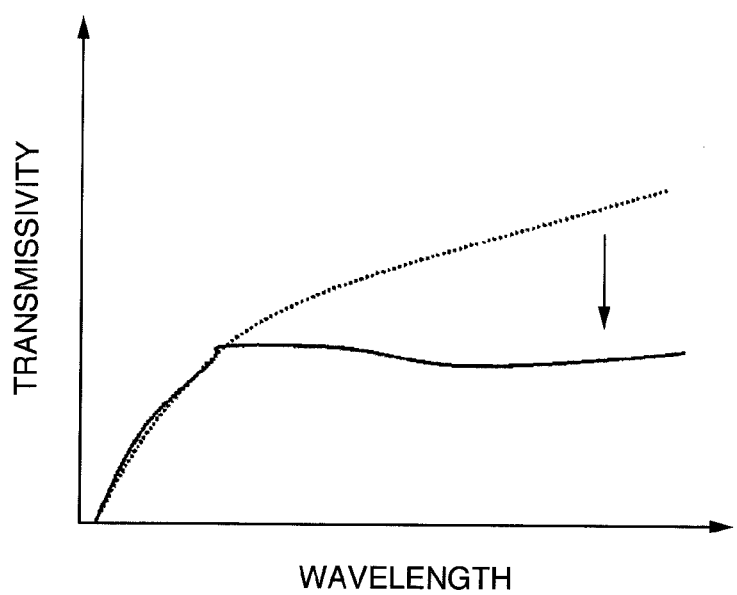
FIG. 6 is a graph showing an example of a transmissivity characteristic of an ink 6b used in the light amount adjustment member 6 of the first example.

For the material of the ink, materials of two or more colors may be used. For example, in cases where LED 2 having a spectrum shown in FIG. 5 is used, the use of a material allowing the spectrum (peak wavelength band) on the short wavelength side to transmit therethrough would provide a high light-extraction efficiency (use efficiency). However, an ordinary white ink has the transmission property shown by a dotted line of FIG. 6. When the light having the spectrum of FIG. 5 transmits through the white ink having the transmissivity as shown by the dotted line of FIG. 6, the transmission of the light on the short wavelength side relatively decreases. Therefore, the rate of the blue wavelength component included in the transmission light decreases and consequently the light looks yellowish. For this reason, for example, if a blue ink is mixed into a white ink, then as shown by a solid line of FIG. 6, the transmissivity becomes flat in a visible region, and the coloring as described above can be reduced. Here, while the spectrum having a peak on the short wavelength side has been taken as an example and described, this approach can be applicable also when the spectrum has a peak in other wavelength band, of course. Moreover, two or more color inks may be mixed.

Figure 7:
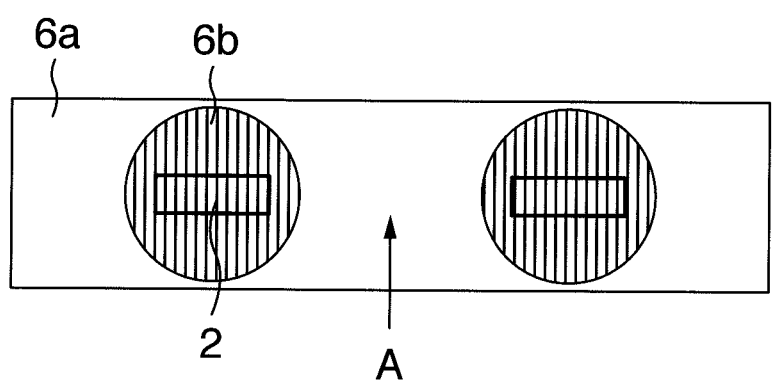
FIG. 7 is a view of the light amount adjustment member 6 according to the first example when seen from a light exit surface side 1b of the light guide plate 1.

An example of the shape of the light amount adjustment member 6 is shown in FIG. 7. FIG. 7 is a view of the light amount adjustment member 6 when seen from the light exit surface 1b side of the light guide plate 1. As illustrated, the ink 6b as the light exit amount reduction part is positioned directly above each LED 2 in the light exit surface 1b of the light guide plate 1, and is circular and has such a size that encompasses each LED 2 from the light exit surface 1b side. The transparent sheet 6a in the form of a rectangle with the arrangement direction of LED 2 taken as the longitudinal direction is arranged. Note that, reference numeral "A" in the view indicates a region between LEDs, and in this example, the ink 6b shall not be provided in this region.

The shape of the ink 6b is circular in this example but may be elliptic, or polygonal, such as square or rectangular, as long as it is a shape encompassing the light heading directly upward of LED 2. However, because how the light spreads varies according to the exit direction of the light of the LED or to the structure of the light guide plate, it is preferable to use the shape of the ink 6b fit for the respective structures. With regard to the optimum shape of the ink 6b according to this example, in order to show a difference in the brightness distribution between this example and the case of using the direct type, the shape of the ink 6b optimum for the direct type LED is shown first, and next the optimum shape of the ink 6b in the case of using a side view type LED according to this example is described.

Figure 20:
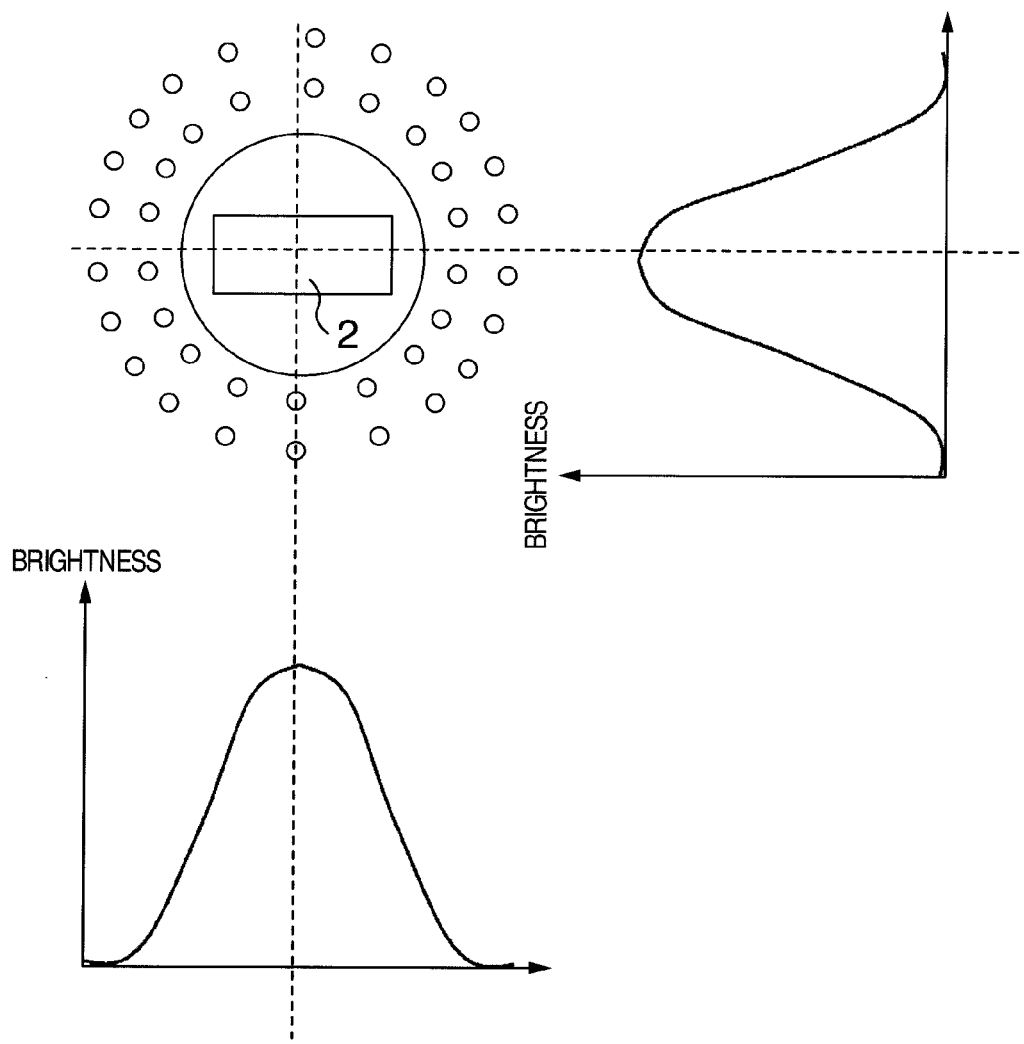
FIG. 20 is a view when a direct type LED is observed from a light exit direction side.

FIG. 20 is a view of the direct type LED when seen from the light exit direction side. In the direct type LED, because the light uniformly spreads in a substantially radial direction (radially) when seen from the display surface side of the liquid crystal panel, a pattern for uniformly adjusting the amount of light in the radial direction is required. For this reason, for the shape of the ink 6b, a circle or a vertically (in the light exit direction of LED 2) and/or bilaterally (in the arrangement direction of LED 2) symmetrical shape, in which small circles are radially and uniformly scattered, as shown in FIG. 20, is the optimum. Next, the optimum shape of the ink 6b in the case of using the side view type LED of this example is described with reference to FIG. 21.

Figure 21:
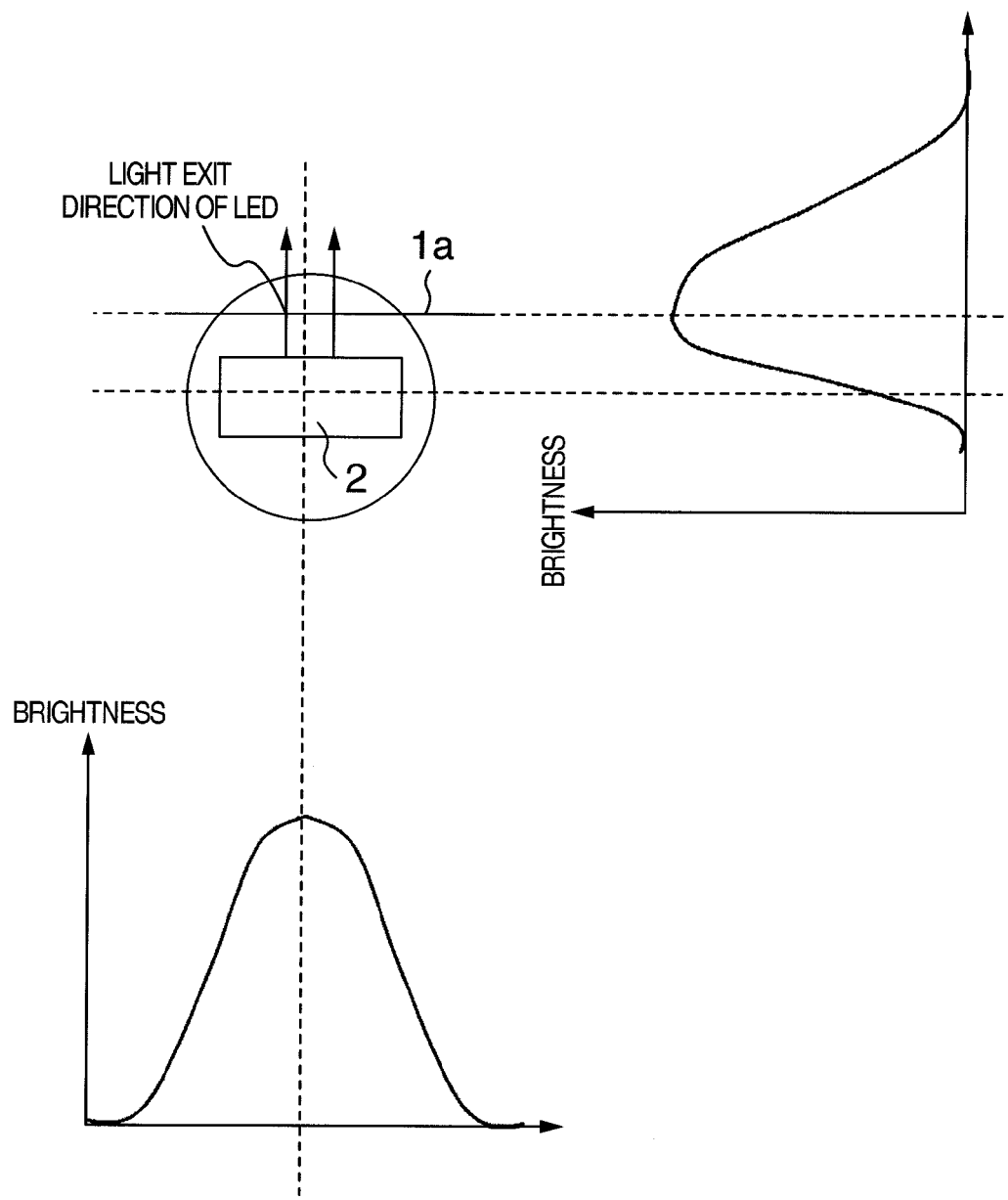
FIG. 21 is a view when a side view type LED in the first example is observed from the light exit surface 1b side of the light guide plate 1.

FIG. 21 is a view of the side view type LED in this example 1 when observed from the light exit surface 1b of the light guide plate 1. As compared with the direct type LED shown in FIG. 20, when seen from the light exit surface side of the light guide plate, a brightness distribution with reference to the optical axis of the LED is substantially symmetric. However, there is a deviation in the brightness distribution with reference to a line perpendicular to the optical axis of the LED, the line extending through the center of the LED. Note that, in the following, for convenience, the optical axis direction of the LED is referred to as the vertical direction and the direction perpendicular to the optical axis of the LED is referred to as the horizontal direction. In the brightness distribution in the vertical direction, as illustrated, the brightness on the near side of the incident surface 1a of the light guide plate rather than at the center of the LED is the highest, and the broadening of the distribution is large on the light exit direction side rather than on the back surface side of the LED. For this reason, in this example, the optimum shape of the ink 6b in the case of using the side view type LED is horizontally symmetric (i.e., symmetric with reference to the optical axis of the LED) but needs to be vertically asymmetric (i.e., asymmetrical with reference to a line perpendicular to the optical axis of the LED, the line extending through the center of the LED) so as to correspond to the brightness distribution in the vertical direction. The shape of the ink 6b taking into consideration the brightness distribution of the side view type LED shown in FIG. 21 is described using FIG. 8.

Figure 8:
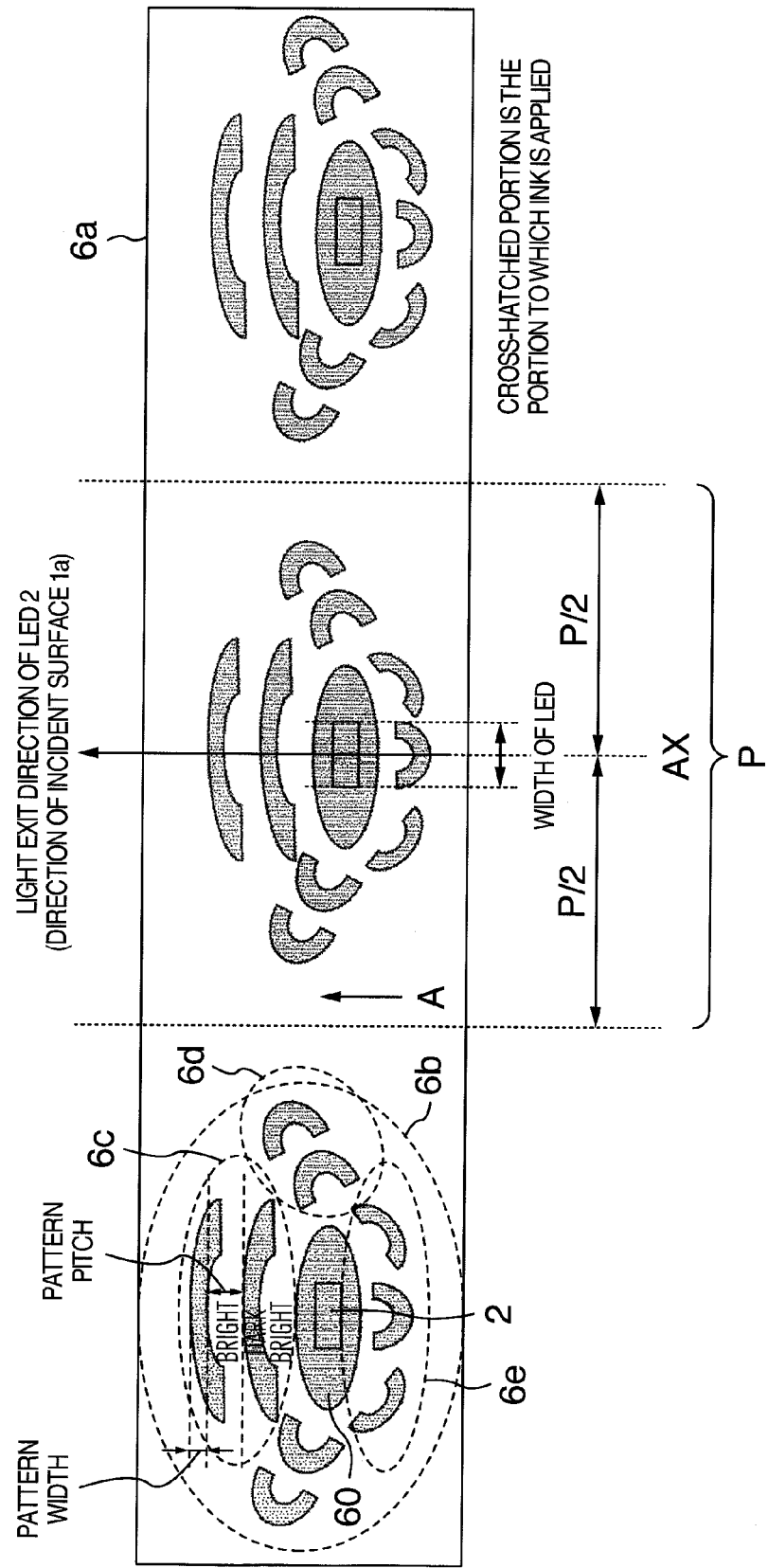
FIG. 8 is a view showing one specific example of the ink 6b used in the light amount adjustment member 6 according to the first example.

FIG. 8 shows an example of the specific shape of the ink 6b adapted for the brightness distribution of the side view type LED and effective for a reduction in the uneven brightness. The ink 6b comprises: an elliptic light-shielding pattern 60, which is a first light-shielding pattern, for example, with an elliptic shape for reducing the light transmission amount, the elliptic light-shielding pattern 60 being provided directly above LED 2; and a plurality of peripheral light shielding patterns, which is a second light-shielding pattern, each having, for example, a horseshoe shape, a semicircle shape, or a ripple shape different from that of the elliptic light-shielding pattern 60, the peripheral light shielding patterns being provided around the portion directly above LED 2, i.e., provided around the elliptic light-shielding pattern 60. By finely arranging the peripheral light shielding patterns made from the ink 6b as shown in FIG. 8, the light-amount adjusted light can be suitably dispersed, and the formation of a bright section and a dark section allows for a reduction in the uneven brightness. Moreover, in the shape as shown in FIG. 8, different thicknesses may be used between the elliptic light-shielding pattern 60 and the peripheral light shielding pattern made from the ink 6b. For example, because the elliptic light-shielding pattern 60 is positioned directly above the LED where the light leakage is the largest, the thickness thereof is increased, while the thickness of the peripheral light shielding pattern is reduced because the light-shielding capability does not need to be as strong as the elliptic pattern. The thickness of the elliptic light-shielding pattern 60 may be set approximately two times the thickness of the peripheral light shielding pattern. The transmissivity of the elliptic light-shielding pattern 60 is preferably from 10% to 20%. Moreover, the distribution of the ink 6b may be varied according to the brightness distribution, as in gradation. For example, even within the elliptic light-shielding pattern 60, the transmissivity may be gradually increased from the center portion to the circumferential direction, and in addition, with regard to the plurality of peripheral light shielding patterns, the transmissivity of a pattern positioned near the elliptic light-shielding pattern 60 may be set lower than the transmissivity of a pattern at a position farther away therefrom. Moreover, within the respective peripheral light shielding patterns, the transmissivity may be varied.

Next, the shape of the ink 6b of FIG. 8 is described in detail. The ink 6b of FIG. 8 comprises: as the peripheral light shielding pattern, a first peripheral pattern 6c with a horseshoe shape which is horizontally long, for example, the first peripheral pattern 6c being provided in a portion away from the elliptic light-shielding pattern 60 in the light exit direction of LED 2; and a second peripheral pattern 6d with a horseshoe shape, for example, the second peripheral pattern 6d being provided at a portion away from the elliptic light-shielding pattern 60 in the longitudinal direction (i.e., horizontal direction), the second peripheral pattern 6d being provided near to the light exit direction of LED 2. The first peripheral pattern 6c has a function to diffuse the light in the light exit direction (forward) of LED 2 while shielding the light emitted directly upward of LED 2 (to the axis direction perpendicular to the electrode surface of LED 2). That is, the first peripheral pattern 6c is for reducing the uneven brightness by shielding a place, where the light intensity is strong in the light exit direction (forward) of LED 2 and by forming a bright and dark pattern in the light exit direction. The second peripheral pattern 6d has a function to diffuse the light emitted diagonally forward relative to the direction directly above LED 2 (to the axis direction perpendicular to the electrode surface of LED 2) into the A section of FIG. 8, i.e., into the region between LEDs 2. By diffusing the light from LED 2 to the A section, the supply of light to a portion, where the intensity of the light is weak, between LEDs 2 (to the region between LEDs 2) can be increased and the light intensity can be increased.

Furthermore, as the peripheral light shielding pattern according to this example, at a portion away, on the opposite side of the light exit direction of LED 2, from the elliptic light-shielding pattern 60, i.e., diagonally behind or directly behind LED 2, a third peripheral pattern 6e with a horseshoe shape, for example, is formed. The third peripheral pattern 6e has a function to reduce the light amount of the light emitted from LED 2 and reflected by the light incident surface 1a of the light guide plate 1 and traveling to the opposite direction (i.e. the backside of LED 2) of the light exit direction (the direction of the arrow) of LED 2 and the light amount of the light transmitting through the back surface of the package of LED 2 and traveling to the backside of LED 2.

For the respective first peripheral pattern 6c, second peripheral pattern 6d, and third peripheral pattern 6e which are the peripheral light shielding patterns, the pattern width may be reduced or the pattern pitch may be increased according to the distribution of brightness as the respective first peripheral patterns are farther away from the elliptic light-shielding pattern 60. For example, the width of the pattern near the elliptic light-shielding pattern 60 is increased (or the pitch between patterns is reduced) and the width of a pattern far away therefrom is reduced (or the pitch between patterns is increased). Specifically, if the pitch between patterns is in a range from 1/10 of the width of an LED to 1/2 of the arrangement pitch of LEDs, a greater effect of reducing the uneven brightness is obtained. If the pitch between patterns is equal to or less than 1/10 of the width of an LED, the patterns become too near to each other and the area of a bright section becomes small and this bright section may be recognized as a dark section. Moreover, if the pitch between patterns is equal to or greater than 1/2 of an LED pitch, the patterns are too far away from each other and the area of a bright section increases, and the effect of reducing the uneven brightness by the bright and dark pattern cannot be obtained. Therefore, as described above, the pitch between patterns is preferably in the range from 1/10 of the width of the LED to 1/2 of the arrangement pitch of the LEDs.

Figure 18:
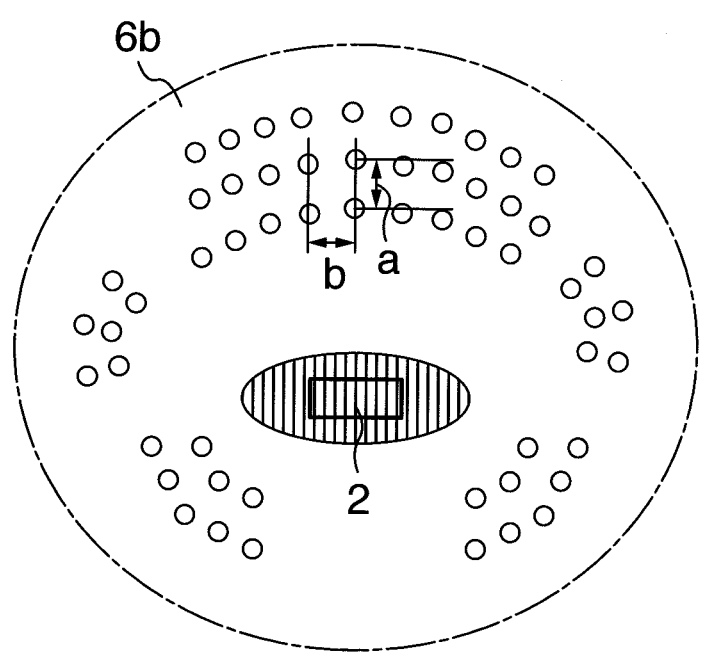
FIG. 18 is a view showing an example of the shape of an ink 6b according to the first example.

The shape of the ink 6b is not limited to that of FIG. 8 as long as it can reduce the uneven brightness by finely forming the bright section and the dark section. For example, a number of small circular patterns as the peripheral light shielding patterns may be arranged around the elliptic light-shielding pattern, as shown in FIG. 18. By applying such a shape, the bright section and the dark section are further subdivided and the light can be suitably dispersed. Furthermore, the diameter of the small-circular pattern may be reduced and/or the pitch between the small circles (distances "a" and/or "b") may be increased as the separation distance from LED 2 increases, Thus, the uneven brightness can be further improved.

Figure 19A:
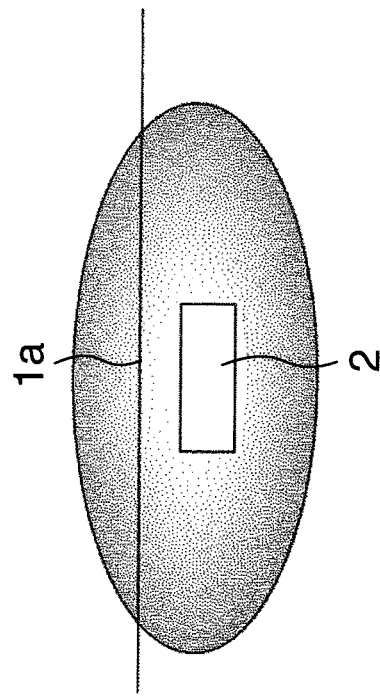
FIG. 19A is a view showing an example of an elliptic light-shielding pattern 60 directly above LED 2 in FIG. 18.
Figure 19C:
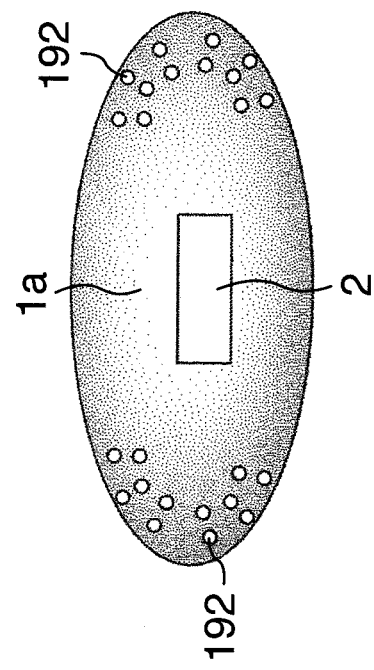
FIG. 19C is a view showing an example of the elliptic light-shielding pattern 60 directly above LED 2 in FIG. 18.
Figure 19B:
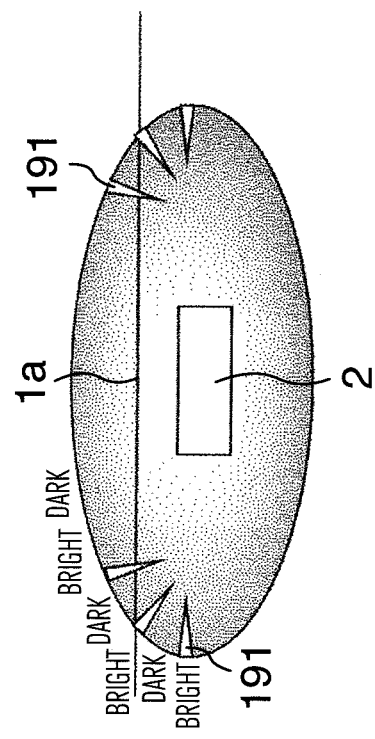
FIG. 19B is a view showing an example of the elliptic light-shielding pattern 60 directly above LED 2 in FIG. 18.

Here, the optimum shape of the elliptic light-shielding pattern 60 for shielding the light directly above LED 2 is described referring to FIGS. 19A, 19B, and 19C.

FIG. 19A is a view showing a problem of the elliptic light-shielding pattern 60 directly above LED 2 in FIG. 8 and FIG. 18. Because the uneven brightness is caused by a brightness difference between a bright section and a dark section, the variation in brightness is preferably gradual, not abrupt. However, in the elliptic light-shielding pattern 60, a steep brightness step is generated at its boundary. In particular, the larger the size of the elliptic light-shielding pattern 60, the more noticeable the brightness step becomes. The boundary of the elliptic light-shielding pattern 60 serves as a dark section because light is not output therefrom, and if this dark section continues across an LED row, it can be viewed as a dark line. Then, in this example, in order to suppress the dark section generated at the boundary of the elliptic light-shielding pattern 60, the elliptic light-shielding pattern 60 has a shape as shown in FIG. 19B or 19C.

In the elliptic light-shielding pattern 60 shown in FIG. 19B, a plurality of slits 191 for allowing light to exit therethrough are provided at the boundary of the elliptic light-shielding pattern 60. The provision of such slits 191 forms a bright and dark pattern at the boundary, improves the brightness at the boundary, and improves the uneven brightness at the boundary. The width of the slit 191 is preferably approximately 1/10 of the longitudinal dimension of the LED. In the elliptic light-shielding pattern 60 shown in FIG. 19C, a hole 192 is provided in the periphery of the elliptic light-shielding pattern 60 to cause light to exit therethrough. Even with this shape, a bright and dark pattern can be formed at the boundary, the brightness at the boundary can be improved, and the uneven brightness at the boundary can be improved. The shape of the boundary is not limited to those shown in FIGS. 19B and 19C, but any shape may be used as long as the same effect can be obtained by forming the bright and dark pattern at the boundary.

Here, as shown in FIG. 8, the pattern of the ink 6b is arranged so as to position within a half of a distance P between LEDs 2 adjacent to each other in the horizontal direction about the optical axis (AX) of LED 2, so as not to overlap with the adjacent ink pattern.

Figure 11:
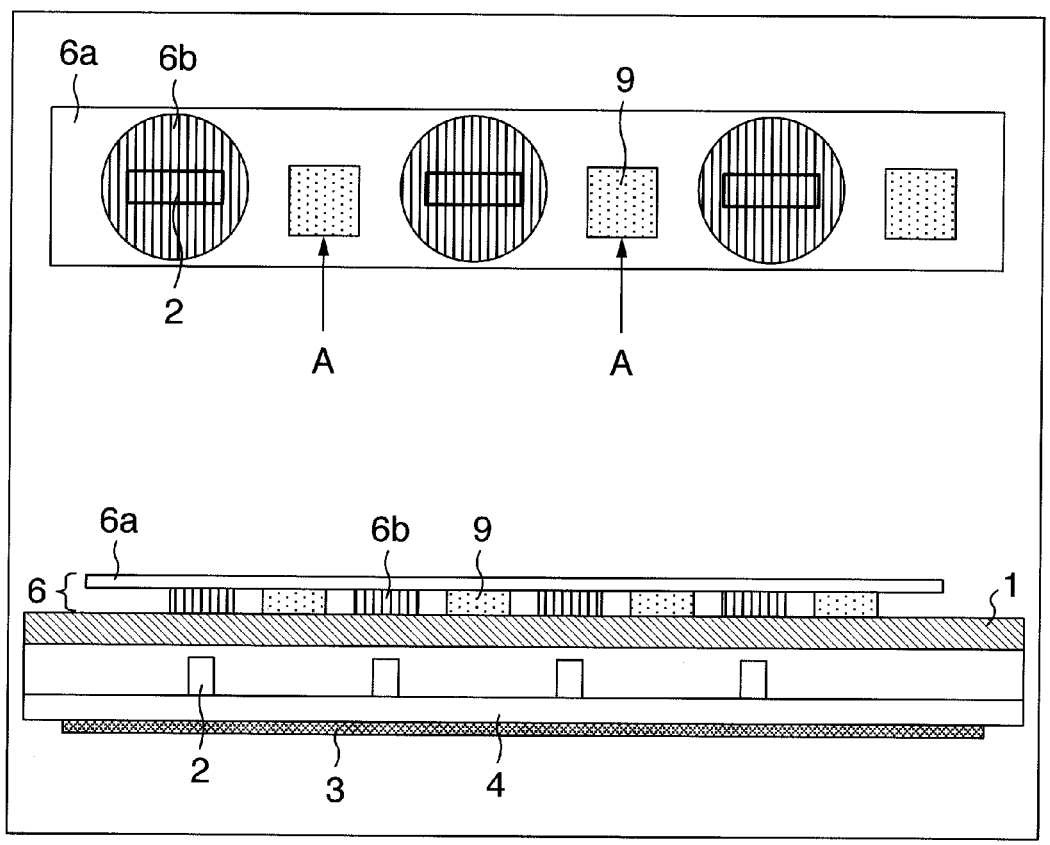
FIG. 11 is a view showing an example of the method of attaching the light amount adjustment member 6 to the light guide plate 1.

Next, a method of fixing the light amount adjustment member 6 is described with reference to FIG. 11. As shown in FIG. 11, the ink 6b is applied in the shape of a circle at a position corresponding to each LED 2 in the light exit surface 1b of the light guide plate 1 so as to encompass each LED 2 from the light exit surface 1b side. The transparent sheet 6a is arranged thereabove. The transparent sheet 6a is stuck to the light guide plate 1 with a double-stick tape 9 between LEDs 2 adjacent to each other (an A section of FIG. 11) in the light exit surface 1b on the light guide plate 1. Then, for the double-stick tape 9, a transparent double-stick tape is preferably used so as not to block the light between LEDs 2 (the light in the section A of FIG. 11). Not limited to the double-stick tape, for example, a transparent paste or adhesive may be printed on the transparent sheet 6a, which then may be stuck to the light guide plate 1. Because this would simplify the manufacturing process as compared with the case where the transparent sheet 6a is stuck using the double-stick tape, the cost can be reduced.

Figure 12:
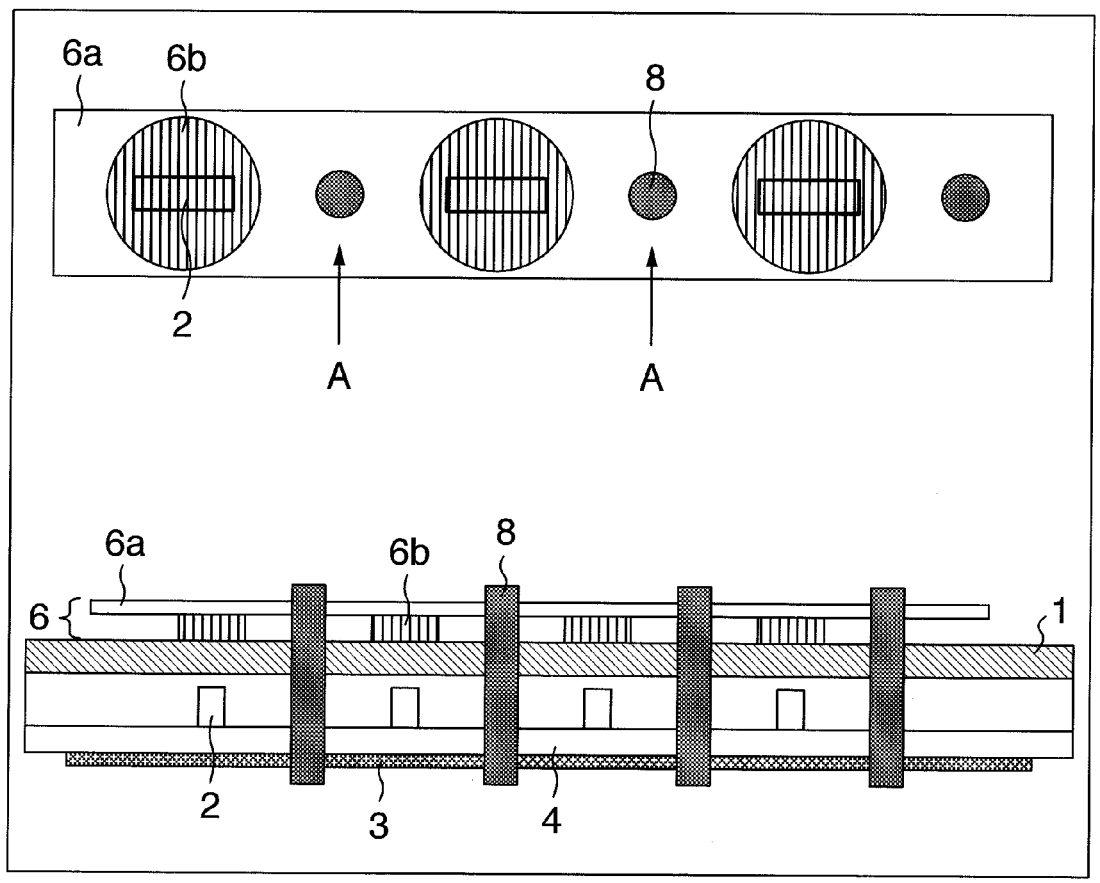
FIG. 12 is a view showing another example of the method of attaching the light amount adjustment member 6 to the light guide plate 1.
Figure 13:
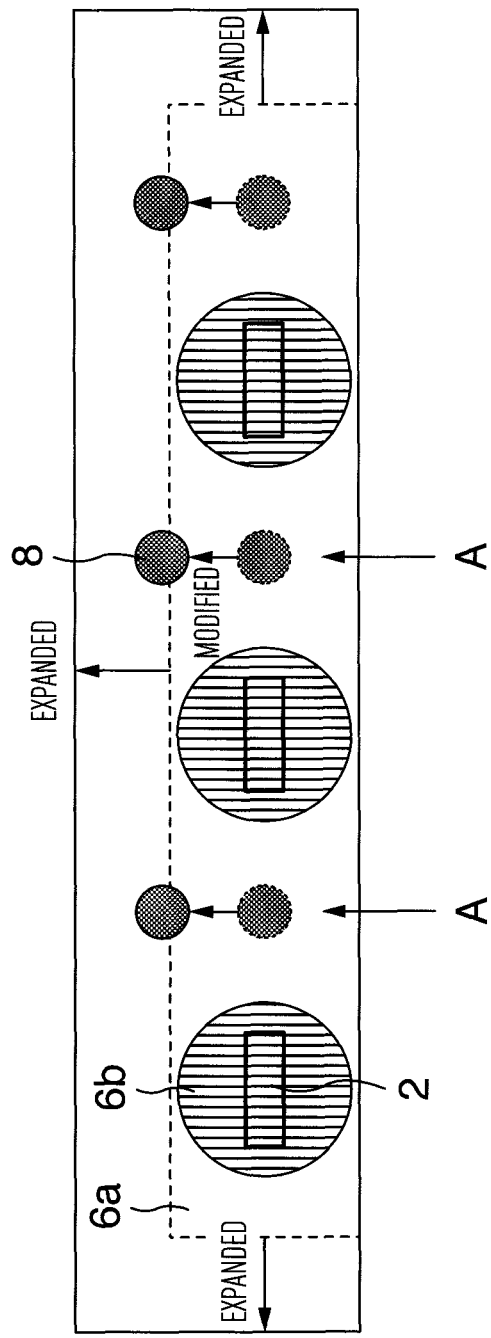
FIG. 13 is a view showing yet another example of the method of attaching the light amount adjustment member 6 to the light guide plate 1.

Another method of fixing the light amount adjustment member 6 is described with reference to FIG. 12. In this example, as shown in FIG. 12, the optical sheet support 8 is inserted so as to extend through the light amount adjustment member 6 (particularly, the transparent sheet 6a), the light guide plate 1, the reflection sheet 4, and the LED substrate 3, thereby fixing these parts so as to sandwich. For the optical sheet support 8, a rivet pin or a screw may be used. For the optical sheet support 8, anything may be used as long as it can extend through and fix each element as described above, but a white one that tends to reflect light or a transparent one that does not block the output of light is preferably used. Moreover, as shown in FIG. 13, the optical sheet support 8 may be configured so as to be able to freely change the fixing position of the optical sheet support 8. In changing the fixing position, the width/length of the transparent sheet 6a of the light amount adjustment member 6 may be arbitrarily changed. In any case, any configuration capable of holding the light amount adjustment member 6 may be employed.

As the method of fixing the light amount adjustment member 6, fixing by the optical sheet support 8 and fixing by the double-stick tape 9 can be combined, of course.

As described above, according to this example, the uneven brightness can be reduced when the groove 11 is formed on the back surface side of the light guide plate 1 and the LED is arranged in this groove. In addition, the reduction in uneven brightness can be performed while improving the light extraction efficiency. Therefore, according to this example, a back light unit with a high light-use efficiency and with high spatial brightness uniformity can be provided and furthermore a high-definition video display device can be provided.

Example 2

In a second example, because the configuration other than the light amount adjustment member 6 is the same as that of the first example described above, hereinafter only the light amount adjustment member 6 according to the second example is described.

Figure 9:
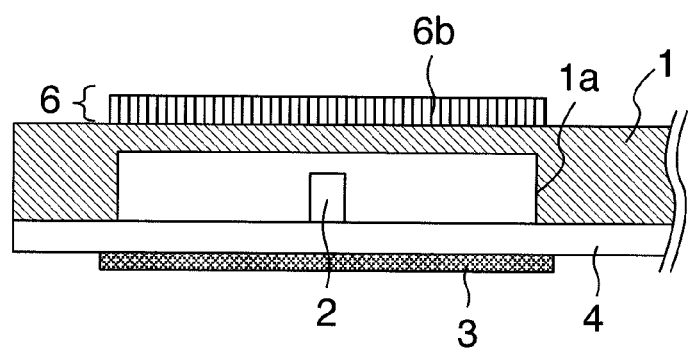
FIG. 9 is a view showing the shape of the light amount adjustment member 6 according to a second example of the present invention.

FIG. 9 is a view showing the configuration of the light amount adjustment member 6 according to the second example. Example 2 differs from Example 1 in that the ink 6*b* is directly applied onto the light guide plate 1 without using the transparent sheet 6*a*. With regard to the shape of the ink 6*b*, ink material, thickness, color mixing ratio rate, and the like, the same pattern as that of the first example can be applied. Moreover, the same effects as those of the first example can be obtained, of course. After directly applying the ink 6*b* onto the light guide plate 1, the transparent sheet 6*a* may be applied onto the light guide plate 1 and the ink 6*b* in order to adjust the transmission of light.

Example 3

In a third example, because the configuration other than light amount adjustment member 6 is the same as that of the first example described above, hereinafter only the light amount adjustment member 6 according to the third example is described.

Figure 10:
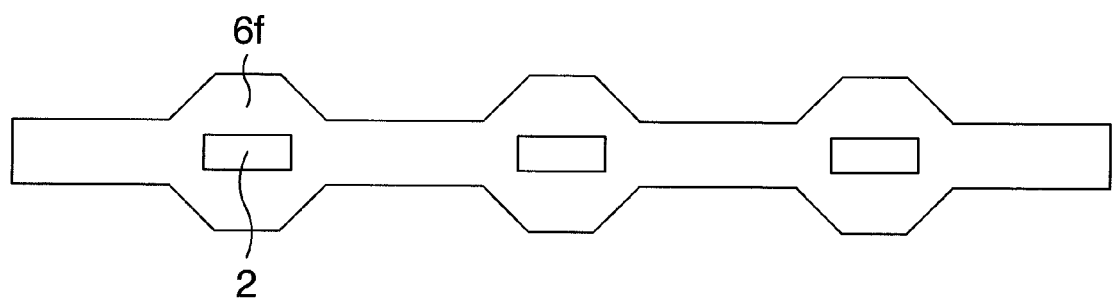
FIG. 10 is a view showing the shape of the light amount adjustment member 6 according to a third example of the present invention.

FIG. 10 is a view showing the shape of the light amount adjustment member 6 according to the third example. Example 3 differs from Example 1 and Example 2 in that as the light amount adjustment member 6, a diffuse reflection sheet 6*f* in place of the transparent sheet 6*a* and ink 6*b* is used. Hereinafter, the third example is described.

In Example 1 described above, for example, when the configuration as shown in FIG. 7, FIG. 8, or FIG. 11 is used, the light-shielding pattern corresponding to each LED needs to be formed in the transparent sheet 6*a* by applying the ink 6*b* thereto and the resulting transparent sheet 6*a* needs to be stuck to the light guide plate 1 for each row in which LEDs are arranged, and therefore the assembly man-hour (in the sticking step) becomes huge. For this reason, taking into consideration the assembly man-hour, an element (light-shielding pattern) corresponding to the ink 6*a* of the light amount adjustment member 6 is preferably connected to each other in one row in the horizontal direction.

Then, in this example, the diffuse reflection sheet 6*f* in which the light-shielding patterns as many as the number of LEDs are integrally formed is used. In a surface on the light guide plate 1 side of the diffuse reflection sheet 6*f* and/or in a surface on the opposite side thereof, a rough surface having thereon minute irregularities is formed by matting, for example. Moreover, in the diffuse reflection sheet 6*f*, when the light guide plate 1 is seen from the light exit surface 1*b* side, the portion corresponding to LED 2 is larger in the vertical direction than the portion between LEDs, so that the light heading directly upward of LED 2 is suitably diffused. The degree of diffusion of the diffuse reflection sheet 6*f* is preferably high in the portion corresponding to LED 2 than in the portion between LEDs. In the portion between LEDs, there is no need to form the rough surface.

According to this example, the step of forming the light-shielding pattern corresponding to each LED using the ink 6*b* can be omitted, and the assembly man-hour can be reduced. While the shape of the portion corresponding to LED 2 of the diffuse reflection sheet 6*f* is hexagonal in FIG. 10, it may be square, or may be circular or horizontally-long elliptic. Moreover, for the shape of the diffuse reflection sheet 6*f* according to this example, the same one as those of Example 1 and Example 2 may be used.

Example 4

Next, a fourth example of the present invention is described. Because the configuration other than optical sheet 5 and the light amount adjustment member 6 are the same as that of the first example described above, hereinafter only the optical sheet 5 and the light amount adjustment member 6 according to the fourth example are described.

Figure 14:
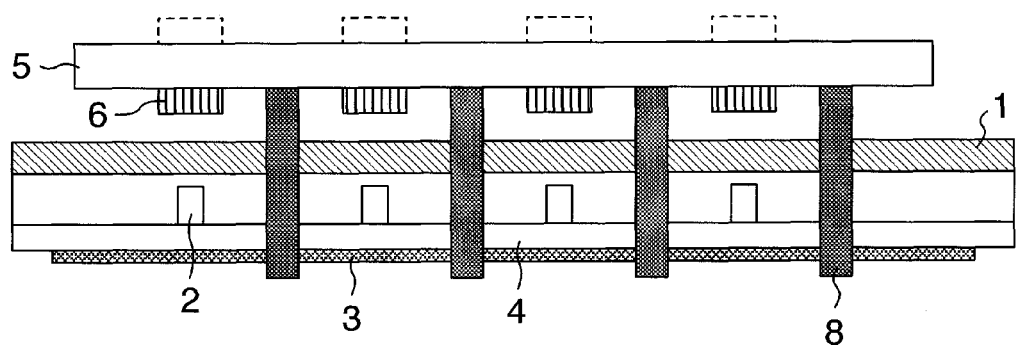
FIG. 14 is a view showing a first example of the configuration of an optical sheet 5 and the light amount adjustment member 6 according to a fourth example.

FIG. 14 is a first example of the configuration of the optical sheet 5 and light amount adjustment member 6 according to the fourth example, showing the X-X' cross sectional view in the configuration of FIG. 2.

In this example, the light amount adjustment member 6 is arranged in a surface facing the light guide plate 1 of the optical sheet 5, not arranged in the light guide plate 1, and the optical sheet 5 is supported by the optical sheet support 8. The light amount adjustment member 6, as with Example 1 and etc., is provided at a position of the optical sheet 5 corresponding to the arrangement position of LED 2 or to the forming position of the groove 11 when seen from the display surface side of the liquid crystal panel. For the light amount adjustment member 6, the same one as that of Example 1 or Example 3 can be used. Here, the optical sheet 5 includes a diffusion plate, a diffusion sheet, a prism sheet, a brightness enhanced film (BEF: brightness enhanced film), and like, as described above.

In FIG. 14, the optical sheet 5 is spaced apart from the light guide plate 1 by a predetermined-distance (hereinafter, this distance is referred to as the "diffusion length"). However, the diffusion length may be set to zero and the optical sheet 5, in which the light amount adjustment member 6 is provided, may be placed in close contact with the light guide plate 1 so as to be supported by the light guide plate 1 and the optical sheet support 8.

The light amount adjustment member 6, depending on the configuration of the optical sheet 5, may be provided above the diffusion plate or may be provided above the diffusion sheet or above a condensing film such as BEF. The light amount adjustment member 6 may be made by printing using an ink, as with Example 1, or may comprise a diffuse reflection sheet or the like, as with Example 3. While the light amount adjustment member 6 is arranged on the light guide plate 1 side of the optical sheet 5 in FIG. 14, it may be arranged in the surface on the liquid crystal panel of the optical sheet 5. The light amount adjustment member 6 may be arranged on both surfaces: a surface on the light guide plate 1 side of the optical sheet; and a surface on the liquid crystal panel side. In any case, any configuration capable of limiting the amount of light heading directly upward of LED 2 by means of the light amount adjustment member 6 may be employed.

Figure 15:
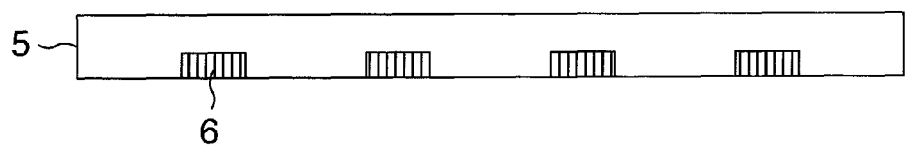
FIG. 15 is a view showing a second example of the method of attaching the light amount adjustment member to the optical sheet 5.

FIG. 15 shows a second example of the method of attaching the light amount adjustment member to the optical sheet 5. In the second example, as shown in FIG. 15, a groove is provided, for example, in a surface on the light guide plate 1 side of the diffusion plate of the optical sheet 5, and the light amount adjustment member 6 is arranged so as to be embedded into this groove portion. Such a configuration can be used to reduce the thickness of the optical sheet 5 by the amount of the thickness of the light amount adjustment member as compared with the configuration of FIG. 14. In the second example, the groove is provided on the light guide plate 1 side of the optical sheet 5 to arrange the light amount adjustment member 6 therein. However, the groove may be provided in a surface on the liquid crystal panel side of the optical sheet 5 to arrange the light amount adjustment member 6 therein, or may be arranged on both surfaces: a surface on the light guide plate 1 side of the optical sheet; and a surface on the liquid crystal panel side.

Figure 16:
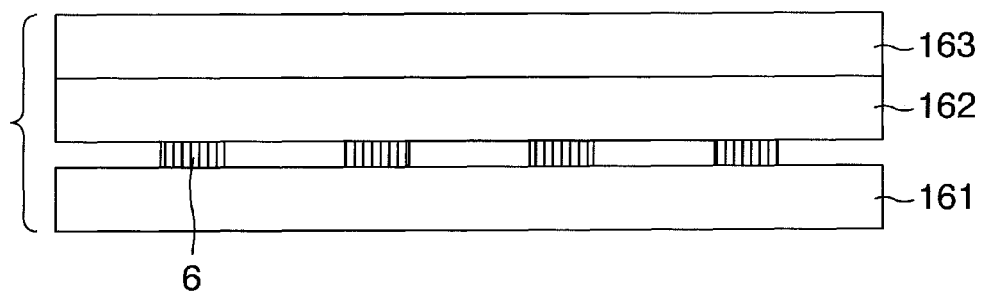
FIG. 16 is a view showing the second example of the method of attaching the light amount adjustment member to the optical sheet 5.

FIG. 16 shows a third example of the method of attaching the light amount adjustment member to the optical sheet 5. In the third example, as shown in FIG. 16, the optical sheet 5 comprises: three sheets comprising a bottom sheet 161 closest to the light guide plate 1 (not shown in this view), a center sheet 162, and a top sheet 163 closest to the liquid crystal display panel (not shown in this view); and the light amount adjustment member 6. Then, the light amount adjustment member 6 is sandwiched between the bottom sheet 161 and the center sheet 162. For example, if the bottom sheet 161 is a diffusion plate, the center sheet 162 is a diffusion sheet, and the top sheet 163 is BEF, then the light amount adjustment member 6 will be sandwiched between the diffusion plate and the diffusion sheet. The light amount adjustment member 6 may be made by printing using an ink, as with Example 1, or may comprise a diffuse reflection sheet or the like, as with Example 2.

In the configuration described above, the light amount adjustment member 6 may be provided above the diffusion plate or may be provided above the diffusion sheet. Moreover, as with FIG. 15, a groove may be provided in the diffusion plate or the diffusion sheet to embed the light amount adjustment member 6 therein. While the light amount adjustment member 6 is provided between the bottom sheet 161 and the center sheet 162 in FIG. 16, it may be provided between the center sheet 162 and the top sheet 163. Moreover, the light amount adjustment member 6 may be provided both between the bottom sheet 161 and the center sheet 162 and between the center sheet 162 and the top sheet 163, or may be arranged in both surfaces: a surface on the light guide plate 1 side; and a surface on the liquid crystal panel side, of each of three sheets. Moreover, other than diffusion plate, diffusion sheet, prism sheet, and BEF typically used as the optical sheet for liquid crystal display devices, another sheet comprising a transparent sheet member may be provided and the light amount adjustment member 6 may be provided at a position corresponding to LED 2 of this sheet.

The shape of the first example can be applied to the light amount adjustment member 6 of this example, of course.

Example 5

Next, a fifth example of the present invention is described. Because the configuration of the fifth example is the same as that of the above-described first example other than the light amount adjustment member 6, hereinafter only the light amount adjustment member 6 according to the fifth example is described.

Figure 17:
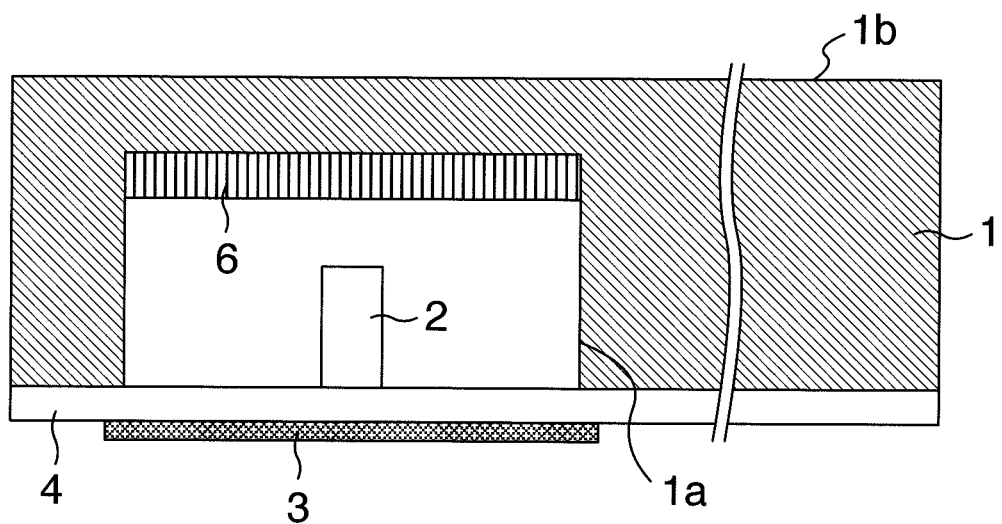
FIG. 17 is a view showing a configuration of the light amount adjustment member 6 according to a fifth example.

FIG. 17 shows the configuration of the light amount adjustment member 6 according to the fifth example. In the fifth example, as shown in FIG. 17, the light amount adjustment member 6, when the light guide plate 1 is seen from the light exit surface 1b side, is arranged at a position corresponding to LED 2 above the groove (recess) 11 (i.e., on the light exit surface 1b side) so as to be in contact with the light guide plate 1. In the above-described first-fourth examples, a step is required for aligning the position of the ink 6a (light exit amount reduction part) of the light amount adjustment member 6 with the position of LED 2 in the vertical and horizontal directions. However, in this example, the alignment at least in the vertical direction does not need to be performed and the arrangement work of the light amount adjustment member 6 can be simplified.

Then, with the above-described configuration, as with Example 1 to Example 4, the light amount adjustment member 6 can reduce the light amount emitted directly upward among the light emitted from LED 2. Note that the light amount adjustment member 6 may be made by printing using an ink, or a member, such as a diffuse reflection sheet, may be stuck as the light amount adjustment member 6. The shape of the light amount adjustment member 6 arranged above the groove (recess) 11 may be of the elliptic light-shielding pattern 60 of Example 1, or may be not only an ellipse but a circle, a square, a rectangle, other polygon, or the like. As with Example 4, the shape of the first example may be applied as the light amount adjustment member 6.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A back light unit comprising:
   a plurality of light sources; and
   a light guide plate for guiding light from the plurality of light sources to a surface of a liquid crystal panel;
   wherein the back light unit is configured to emit light to the surface of the liquid crystal panel from a light exit surface of the light guide plate facing the surface of the liquid crystal panel; wherein at least one recess is provided on a surface of the light guide plate which is opposite to the light exit surface of the light guide plate;
   wherein the plurality of light sources are housed in the at least one recess;
   wherein a light amount adjustment member is provided at a position corresponding to each of the light sources or the at least one recess, on the light exit surface, when seen from a display surface side of the liquid crystal panel;
   wherein the plurality of light sources are a side view type LED for emitting a white light, and the side view type LED emits light in a direction substantially parallel to the light exit surface of the light guide plate; and
   wherein the light amount adjustment member is made from a mixed ink of a white ink and a blue ink.

2. The back light unit according to claim 1, wherein the light amount adjustment member includes a transparent sheet and a light exit amount reduction part provided in the transparent sheet, and wherein the light exit amount reduction part is provided at a position of the light exit surface of the light guide plate corresponding to each light source.

3. The back light unit according to claim 2, wherein the light exit amount reduction part is configured by printing or applying the mixed ink on the transparent sheet.

4. The back light unit according to claim 1, wherein the light amount adjustment member is arranged above an optical sheet arranged on a light exit surface side of the light guide plate or in a groove provided in the optical sheet.

5. The back light unit according to claim 4, wherein the optical sheet is a diffusion plate, a diffusion sheet, or a condensing film.

6. The back light unit according to claim 4, wherein the optical sheet is spaced apart from the light exit surface of the light guide plate by a certain distance.

7. The back light unit according to claim 1, wherein
   the mixed ink is provided at a position of the light exit surface of the light guide plate corresponding to each light source.

8. The back light unit according to claim 7, wherein a transmissivity of the mixed ink increases or an area thereof decreases as a separation distance thereof from the light source increases.

9. The back light unit according to claim 7, wherein
   the mixed ink has a plurality of intermittent patterns, and
   wherein a spacing between the respective patterns is equal to or greater than $1/10$ of a width in a longitudinal direction of the light source and is equal to or less than $1/2$ of a pitch between the light sources.

10. The back light unit according to claim 7, wherein
the mixed ink includes a first light-shielding pattern for reducing light directly above the light source and a second light-shielding pattern arranged around the first light-shielding pattern, and wherein
a transmissivity of the first light-shielding pattern is 10% to 20%.

11. The back light unit according to claim 7, wherein the mixed ink has a shape that disperses light into between the light sources.

12. The back light unit according to claim 7, wherein the mixed ink is provided within a half of a distance between the light sources on each side of an optical axis of the each light source, about the optical axis.

13. The back light unit according to claim 1, wherein
the light amount adjustment member includes a diffuse reflection sheet, and wherein
the diffuse reflection sheet is provided at a position corresponding to the each light source in the light exit surface of the light guide plate.

14. The back light unit according to claim 1, wherein a fine pattern is formed in the light exit surface and/or the opposite surface of the light guide plate.

15. A video display device that displays a video by irradiating a liquid crystal panel with light from the back light unit according to claim 1.

\* \* \* \* \*